United States Patent
Barbetta et al.

(10) Patent No.: US 9,460,085 B2
(45) Date of Patent: Oct. 4, 2016

(54) TESTING AND TRAINING A QUESTION-ANSWERING SYSTEM

(71) Applicant: International Business Machines Corporation, Armonk, NY (US)

(72) Inventors: Jacqueline T. Barbetta, Holly Springs, NC (US); David C. Fallside, Nevada City, CA (US); Drew A. Logsdon, Austin, TX (US); Peter J. Parente, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 14/100,533

(22) Filed: Dec. 9, 2013

(65) Prior Publication Data

US 2015/0161106 A1    Jun. 11, 2015

(51) Int. Cl.
| | |
|---|---|
| G06N 5/04 | (2006.01) |
| G06Q 30/02 | (2012.01) |
| G06Q 10/10 | (2012.01) |
| G06F 17/28 | (2006.01) |
| G06F 17/27 | (2006.01) |
| G06Q 30/00 | (2012.01) |

(52) U.S. Cl.
CPC ............. *G06F 17/28* (2013.01); *G06F 17/271* (2013.01); *G06F 17/274* (2013.01); *G06N 5/04* (2013.01); *G06Q 30/00* (2013.01)

(58) Field of Classification Search
None
See application file for complete search history.

(56) References Cited

U.S. PATENT DOCUMENTS

| | | | |
|---|---|---|---|
| 7,865,452 B2 | 1/2011 | Boies et al. | |
| 2009/0070311 A1 | 3/2009 | Feng | |
| 2010/0063797 A1 | 3/2010 | Cong et al. | |
| 2010/0299139 A1 | 11/2010 | Ferrucci et al. | |
| 2012/0077178 A1 | 3/2012 | Bagchi et al. | |
| 2013/0031122 A1 | 1/2013 | Riezler et al. | |
| 2014/0298199 A1* | 10/2014 | Johnson, Jr. ......... | H04L 65/403 715/753 |

OTHER PUBLICATIONS

Shtok12, Learning from the Past: Answering New Questions with Past Answers [online], Apr. 16-20, 2012 [retrieved on Nov. 2, 2014].Retrieved from the Internet:<URL:http%3A%2F%2Fciteseerx.ist.psu.edu%2Fviewdoc%2Fdownload%3Fdoi%3D10.1.1.232.5772%26rep%3Drep1%26type%3Dpdf>.*

Boldrini et al, "A Parallel Corpus Labeled Using open and Restricted Domain Ontologies," Proceedings of the 10th International Conference on Computational Linguistics and Intelligent Text Processing, Mar. 2009, Mexico City, Mexico, pp. 346-356.

Schlaefer et al, "A Pattern Learning Approach to Question Answering within the Ephyra Framework," Proceedings of the 9th International Conference on Text, Speech and Dialogue, Brno, Czech Republic, Sep. 2006, pp. 687-694.

* cited by examiner

*Primary Examiner* — Stanley K Hill
*Assistant Examiner* — Nathan Brown, Jr.
(74) *Attorney, Agent, or Firm* — VanLeeuwen & Vanleeuwen

(57) ABSTRACT

An approach is provided for an information handling system that includes a processor and a memory to improve the quality of question-answer sets used as inputs to a question-answering (QA) system. In the approach, a question-answer pair is analyzed using natural language processing (NLP) components. Some of the NLP components may be taken from the QA system whose input is being analyzed The question-answer pair includes a question and an answer to the question. Based on the analysis, one or more shortcomings of the question-answer pair are identified. The shortcomings relate to an ability of the target QA system to analyze the question. A human-readable feedback is provided to a user. The feedback recommends one or more possible actions to address the identified shortcomings.

17 Claims, 8 Drawing Sheets

FIG. 5

| |
|---|
| Descriptions of problems detected in Question / Answer analysis |
| Question or answer has misspelled words |
| Question is an incomplete sentence |
| Question is poorly worded question |
| Question or answer has terms unknown to the NLP components |
| Question does not suggest a lexical answer type (LAT) |
| Question LAT does not match correct answer type |
| Answer regular expression has syntax errors |
| Answer regular expression does not match any text in a provided source document |
| Answer regular expression potentially matches incorrect answers |
| Answer regular expression does not consider alternative forms of correct answers |
| Question seeks an answer the QA system cannot produce based on its data or function (e.g., predictions of the future) |
| Recommendations to avoid detected problems |
| Spelling corrections |
| Grammar corrections |
| Rewriting of the question into a proper sentence |
| Replacement of specialized terms with more common terminology |
| Rewording of the question to suggest LATs when possible |
| Rewording of the question to match the LAT to the correct answer type |
| Inclusion of alternative forms of correct answers (e.g., other units, spellings, modifiers, etc.) |
| Correction of regular expression to avoid false-positive matches |
| Correction of regular expression to match a provided human-readable answer/source document |
| Question / Answer characteristics detected (info) |
| List of detected LATs |
| Question classification (e.g., date seeking, person seeking) |

500 — Descriptions of problems detected in Question / Answer analysis
510 — Recommendations to avoid detected problems
520 — Question / Answer characteristics detected (info)

TESTING AND TRAINING A QUESTION-ANSWERING SYSTEM

BACKGROUND OF THE INVENTION

With the increased usage of computing networks, such as the Internet, humans are currently inundated and overwhelmed with the amount of structured and unstructured information available to them from various sources. Information gaps abound as users search for information on various subjects and try to piece together what they find and what they believe to be relevant. To assist with such searches, recent research has been directed to generating knowledge management systems which may take an input, analyze it, and return results indicative of the most probable results to the input. Knowledge management systems provide automated mechanisms for searching through a knowledge base with numerous sources of content, e.g., electronic documents, and analyze them with regard to an input to determine a result and a confidence measure as to how accurate the result is in relation to the input.

One such knowledge management system is the IBM Watson™ system available from International Business Machines (IBM) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA technology used for hypothesis generation, massive evidence gathering, analysis, and scoring. DeepQA takes an input question, analyzes it, decomposes the question into constituent parts, generates one or more hypothesis based on both the decomposed question and the results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

The testing of question-answering system metrics (e.g., accuracy) uses a set of questions with corresponding correct answers. Question-answering systems that make use of supervised machine learning require a similar but independent set of question-answer pairs to enable the training of models. In most domains, such question-answer sets are not immediately available and are created by domain experts. This creation process is a time-consuming and error prone task. Errors in the question-answer sets lead to inaccuracy in predicting system question-answering performance. Errors also lead to machine learning models trained on incorrectly classified instances. These problems are costly when few question-answer pairs are available, when writing new pairs takes significant effort, and when detecting errors requires detailed post hoc analysis.

SUMMARY

An approach is provided for an information handling system that includes a processor and a memory to improve the quality of question-answer sets used as inputs to a question-answering (QA) system. In the approach, a question-answer pair is analyzed using natural language processing (NLP) components. Some of the NLP components may be taken from the QA system whose input is being analyzed The question-answer pair includes a question and an answer to the question. Based on the analysis, one or more shortcomings of the question-answer pair are identified. The shortcomings relate to an ability of the target QA system to analyze the question. A human-readable feedback is provided to a user. The feedback recommends one or more possible actions to address the identified shortcomings.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein:

FIG. 5 is a depiction of various types of feedback that might be provided to the domain expert user at the user interface;

DETAILED DESCRIPTION

Figure 1:
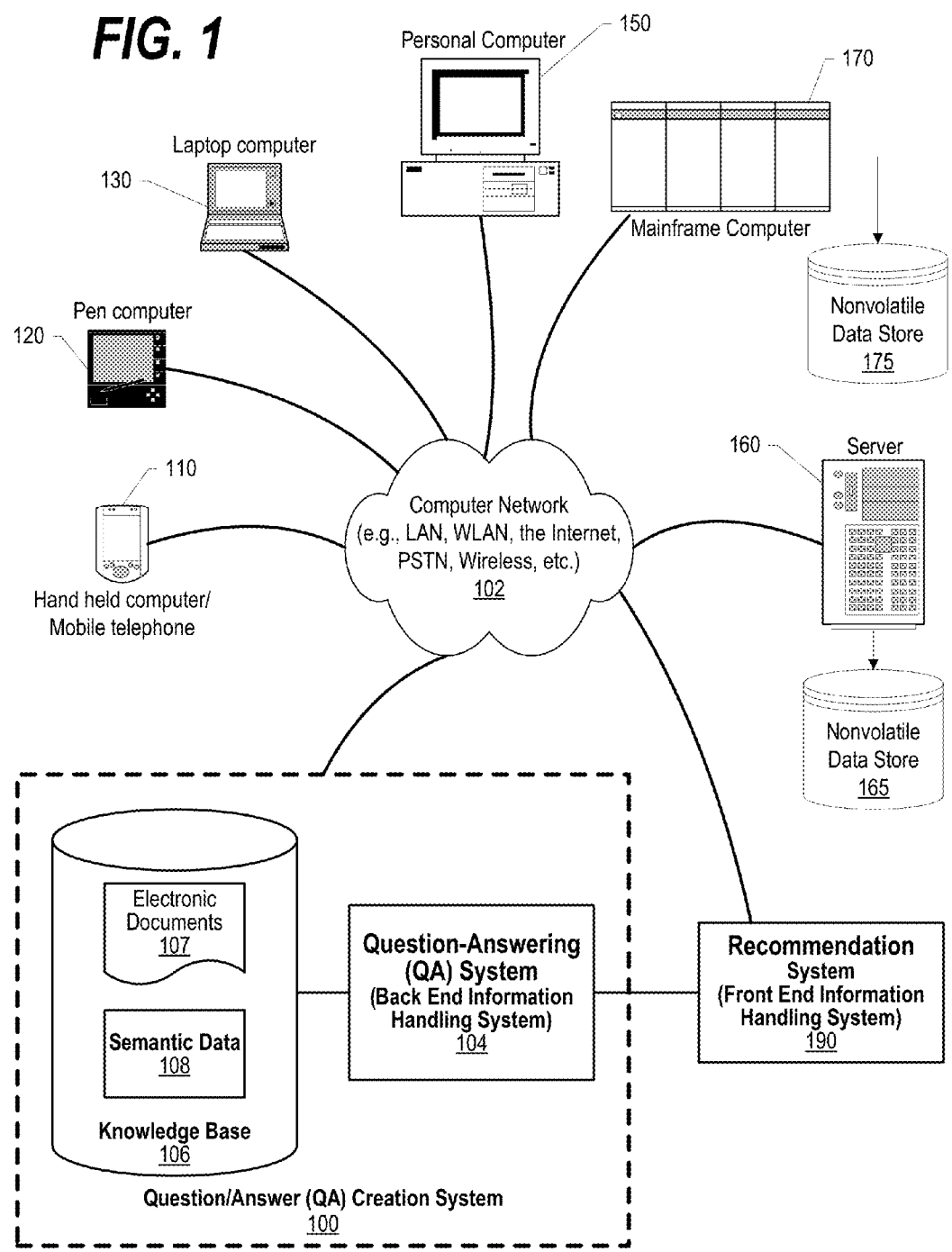
FIG. 1 depicts a network environment that includes a knowledge manager that utilizes a knowledge base.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer, server, or cluster of servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. Question-answer (QA) system 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. QA system 100 and network 102 may enable question/answer generation functionality for one or more content users. Other embodiments of QA system 100 may be used with components, systems, sub-systems, and/or devices other than those that are depicted herein.

QA system 100 may be configured to receive inputs from various sources. For example, QA system 100 may receive input from the network 102, a corpus of electronic documents 106 or other data, a content creator 108, content users, and other possible sources of input. In one embodiment, some or all of the inputs to QA system 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that QA system 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with QA system 100. The document 106 may include any file, text, article, or source of data for use in QA system 100. Content users may access QA system 100 via a network connection or an Internet connection to the network 102, and may input questions to QA system 100 that may be answered by the content in the corpus of data. In one embodiment, the process sends well-formed questions (e.g., natural language questions, etc.) to one or more components of the QA system. QA system 100 may interpret the question and provide a response to the content user containing one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 100. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
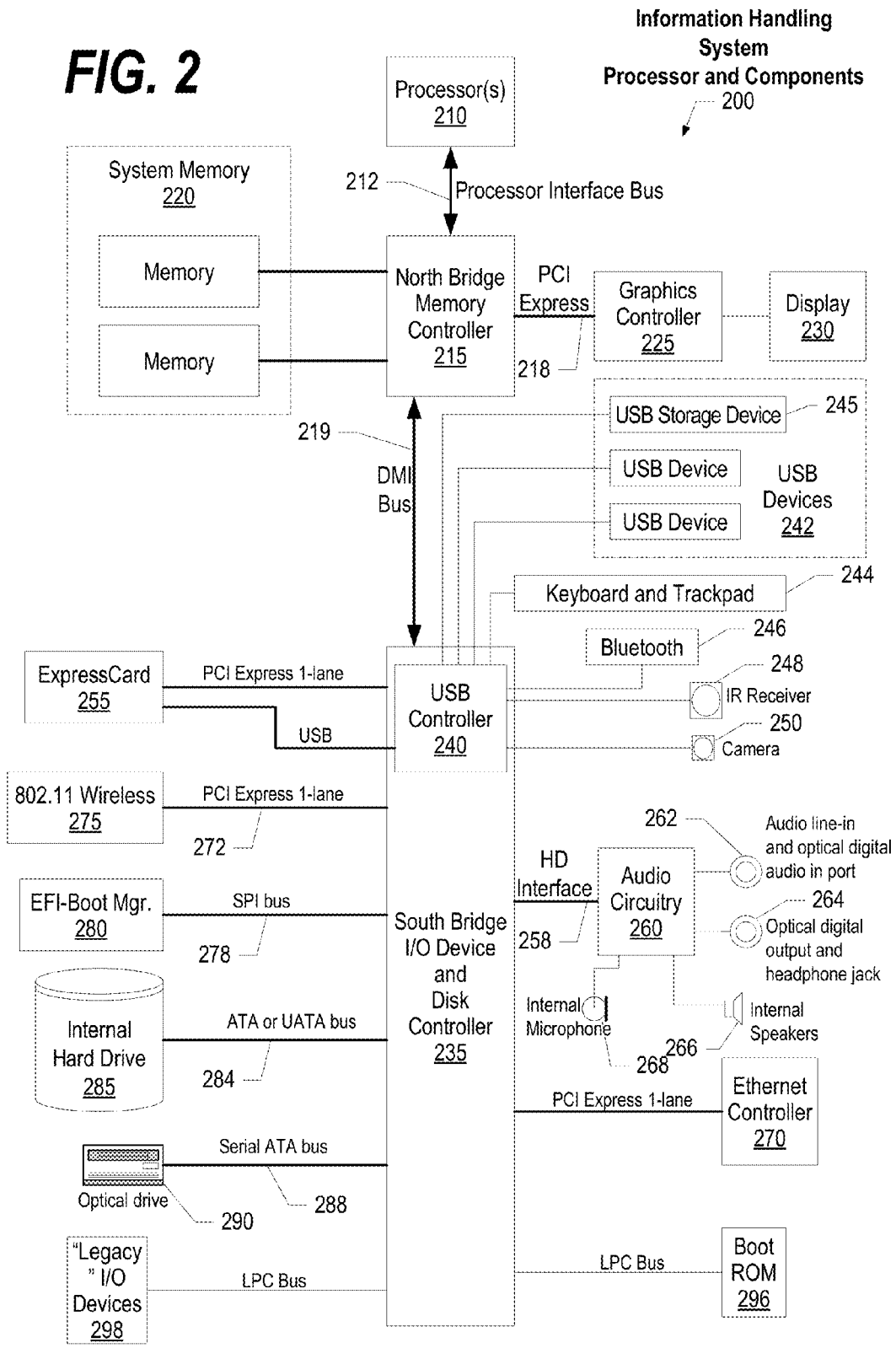
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-8 depict an approach that can be executed on an information handling system, to improve the quality of question-answer sets used as inputs to a question-answer (QA) system, such as QA system 100 shown in FIG. 1. Because question-answer sets are often a low-availability resource and their creation is a high-cost process, it is prudent to minimize the errors they contain and maximize their fitness for training and testing the target QA system. The disclosed system helps improve the quality of questions and answers by analyzing question-answer pairs using natural language processing (NLP) components, both from the target QA system and from external sources. The system describes problems in the input text or shortcomings in the ability of the QA system to analyze it. Further, the system recommends actions a domain expert might take to address the identified issues. The system disclosed herein can evaluate question-answer pairs using NLP from the target QA system plus additional components. This design yields feedback based on the current capabilities of the system, even as the system changes, and also allows the use of analysis techniques not employed in the system. For example, applying our invention to question-answer sets for IBM Watson™, the system might reuse the English Slot Grammar parser on questions and answers but also include a finite state automaton (FSA) component not present in the QA system to evaluate potential matches for an answer regular expression. In addition, the system can use a subset of the target QA system to analyze question-answer pairs, resulting in faster feedback about problems than running question sets through the entire system and analyzing the results against the paired answers afterward. The approach identifies issues (shortcomings) in and gives recommendations about the question-answer set. In addition, a developer can add or subtract analysis components from the system to perform domain-specific question-answer set analysis and provide recommendations customized for the domain expert. The system discussed above is further described in FIGS. 3-8 and accompanying detailed descriptions, discussed below, which provide further details related to one or more embodiments that provide an approach for improving the question/answer pairs used as input to a QA system.

Figure 3:
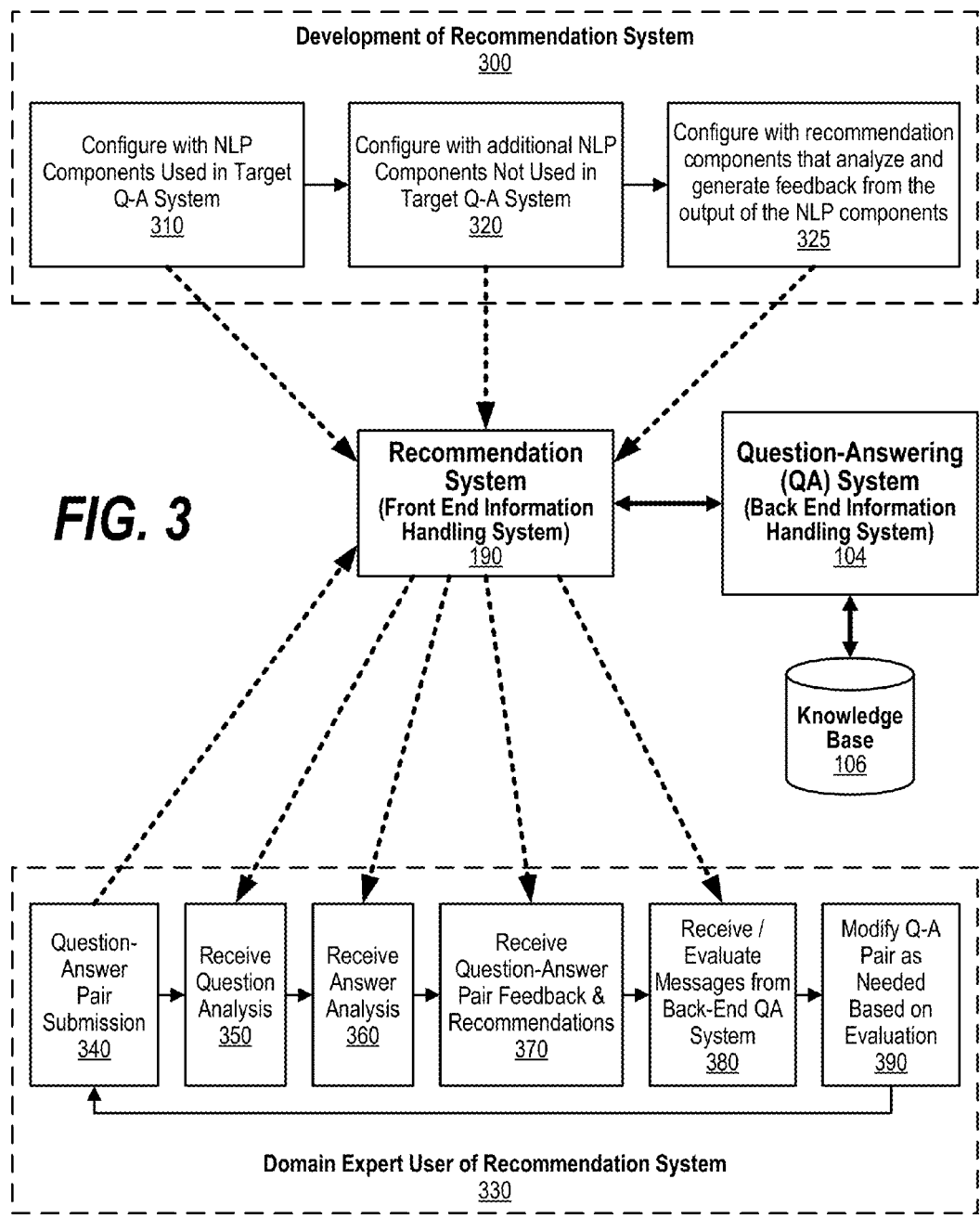
FIG. 3 is a component diagram depicting a recommendation system processing question-answer pairs and providing feedback to a domain expert user.

FIG. 3 is a component diagram depicting a recommendation system processing question-answer pairs and providing feedback to a domain expert user. Phase 300 depicts steps performed in the development of the recommendation system. These steps configure various aspects of the system. At step 310 during of development of the recommendation system, the developers configure with natural language processing (NLP) components that are used in the target question-answer (QA) system. For example, the developer might create an Unstructured Information Management Architecture (UIMA) aggregate by reusing annotators from the target QA system, such as an English Slot Grammar (ESG) annotator included in the QA system. At step 320 during of development of the recommendation system, the developers configure with additional NLP components that are not used in the target QA system. For example, the developer might create a UIMA annotator that uses a finite state automaton (FSA) to generate sample answers from a regular expression. At step 325, during of development of the recommendation system, the developers configure with recommendation components that analyze and generate feedback from the output of the NLP components. For example, the developer might create a UIMA aggregate that contains an annotator that warns about unknown question terms based on a particular term property and another that warns about a regular expression matching too many possible answers. The configured recommendation system 190 is deployed as a web service where it can be utilized by domain expert users.

Phase 330 depicts usage of recommendation system 190 by one or more domain expert users that utilize the recommendation system using a front-end user interface (UI), such as a graphical user interface (GUI) accessible over a computer network, such as the Internet. The steps performed in phase 330 use the configured recommendation system to assist the domain expert user in creating better question-answer pairs that are used by question-answering (QA) system 104. At step 340, the domain expert user utilizes the user interface to provide a question-answer pair that the user wishes to have analyzed. The question-answer pair may also include other metadata, such as a regular expression (regex), and/or a network identifier (e.g., a Uniform Resource Locator, or URL, etc.) of a web page that contains the correct answer to the question included in the question-answer pair. The question-answer pair and any provided additional metadata are submitted to recommendation system 190. At step 350, the domain expert user receives the question analysis back from the recommendation system. At step 360, the domain expert user receives the answer analysis back from the recommendation system. At step 370, the domain expert user receives the question-answer pair feedback and recommendations back from the recommendation system, and, at step 380, the domain expert user receives and evaluates the various feedback returned by the recommendation system. At step 390, based on the domain expert's evaluation of the data returned by the recommendation system, the domain expert modifies the question-answer pair according to the recommendations and analysis performed by the recommendation system. If modifications are needed, the process loops back to step 340 where the domain expert user submits the modified question-answer pair, and any associated metadata, and receives further analysis and recommendation data from the recommendation system. In this manner, the domain expert user can repeatedly refine the question-answer pair in order to formulate a better question-answer pair that can eventually be used to train QA system 104 and provide better data in knowledge base 106 utilized by the QA system.

Figure 4:
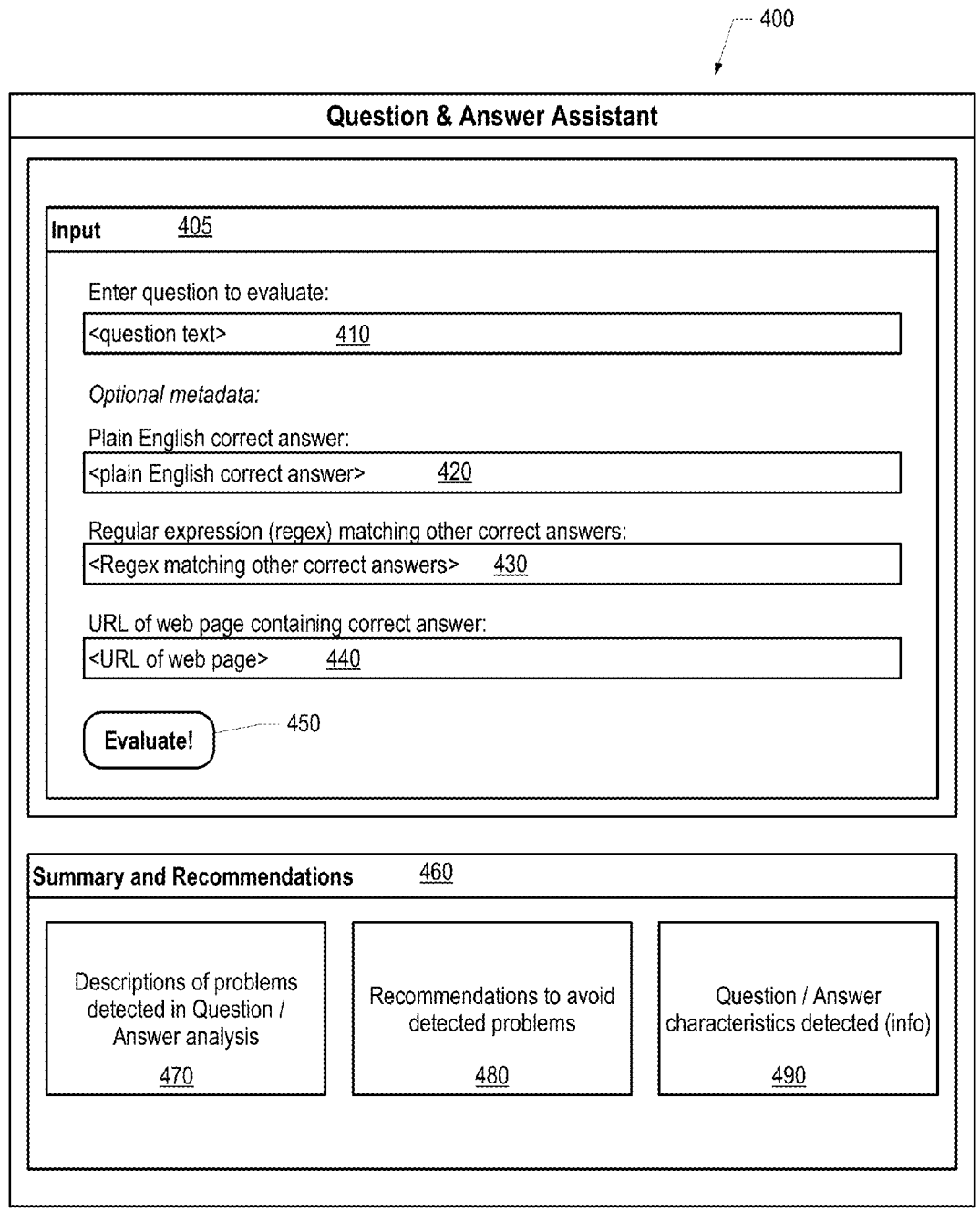
FIG. 4 is a depiction of a user interface utilized by the domain expert to submit question-answer pairs and receive feedback to improve the quality of the question-answer pairs used as input by a question-answer (QA) system.

FIG. 4 is a depiction of a user interface utilized by the domain expert to submit question-answer pairs and receive feedback to improve the quality of the question-answer pairs used as input by a question-answer (QA) system. User interface 400, such as a web page, provides various fields that can be filled in by the domain expert user. Input area 405 includes input fields that the domain expert user fills in with the question-answer pair and any associated metadata, while summary and recommendation area 460 is used to display the summary and recommendations provided by the recommendation system after the domain expert user submits the question-answer pair.

Input area 405 includes question text box 410 where the user enters the question portion of the question-answer pair. Plain answer text box 420 is the input field where the domain expert user enters the plain English (or whatever language is being used) answer to the question that was entered in text box 410. Regular expression (regex) text box 430 is where the domain expert user enters a regular expression that matches other correct answers to the question provided in text box 410. URL text box 440 is where the domain expert user enters a network identifier, such as a Uniform Resource Locator (URL), where the correct answer to the question entered in text box 410. After the user has entered in the various question-answer pair data, the user selects Evaluate command button 450 which causes the data entered in the various text boxes to be sent to the recommendation system for processing. After the recommendation system has analyzed the question-answer pair data, the recommendation system returns the analysis and recommendation data that is displayed in area 460. A more detailed view of the summary and recommendations area is shown in FIG. 5. FIG. 4 provides an overview of the types of summary and recommendations provided by the recommendation system. Box 470 depicts descriptions of problems that the recommendation system detected in the question-answer pair during the recommendation system's question/answer analysis. Box 480 depicts recommendations provided by the recommendation system to assist the domain expert user in avoiding the problems detected from box 470. Box 490 depicts information provided to the domain expert user by the recommendation system, namely the question/answer characteristics that were detected by the recommendation system.

FIG. 5 is a depiction of various types of feedback that might be provided to the domain expert user at the user interface. Descriptions of problems detected in the question/answer analysis (500) includes problems detected in the question provided in the question-answer pair, the answer that was provided in the question-answer pair, or a combination of the question and answer. Types of problems that could be detected include the question or the answer has misspelled words, question is an incomplete sentence, question is poorly worded question, the question or the answer has terms unknown to the NLP components, the question does not suggest a lexical answer type (LAT), the question LAT does not match the correct answer type, the answer regular expression has syntax errors, the answer regular expression does not match any text in a provided source document, the answer regular expression potentially matches incorrect answers, the answer regular expression does not consider alternative forms of correct answers, and the question seeks an answer the QA system cannot produce based on its data or function (e.g., predictions of the future).

Recommendations that are provided by the recommendation system to avoid the detected problems (510) might include spelling corrections, srammar corrections, rewriting of the question into a proper sentence, replacement of specialized terms with more common terminology, rewording of the question to suggest LATs when possible, rewording of the question to match the LAT to the correct answer type, inclusion of alternative forms of correct answers (e.g., other units, spellings, modifiers, etc.), correction of regular expression to avoid false-positive matches, and correction of regular expression to match a provided human-readable answer/source document.

Information regarding the question/answer characteristics detected by the recommendation system that is provided in area 520. This information can include information such as a list of detected LATs, and a question classification (e.g., a date seeking question, a person seeking question, etc.).

Figure 6:
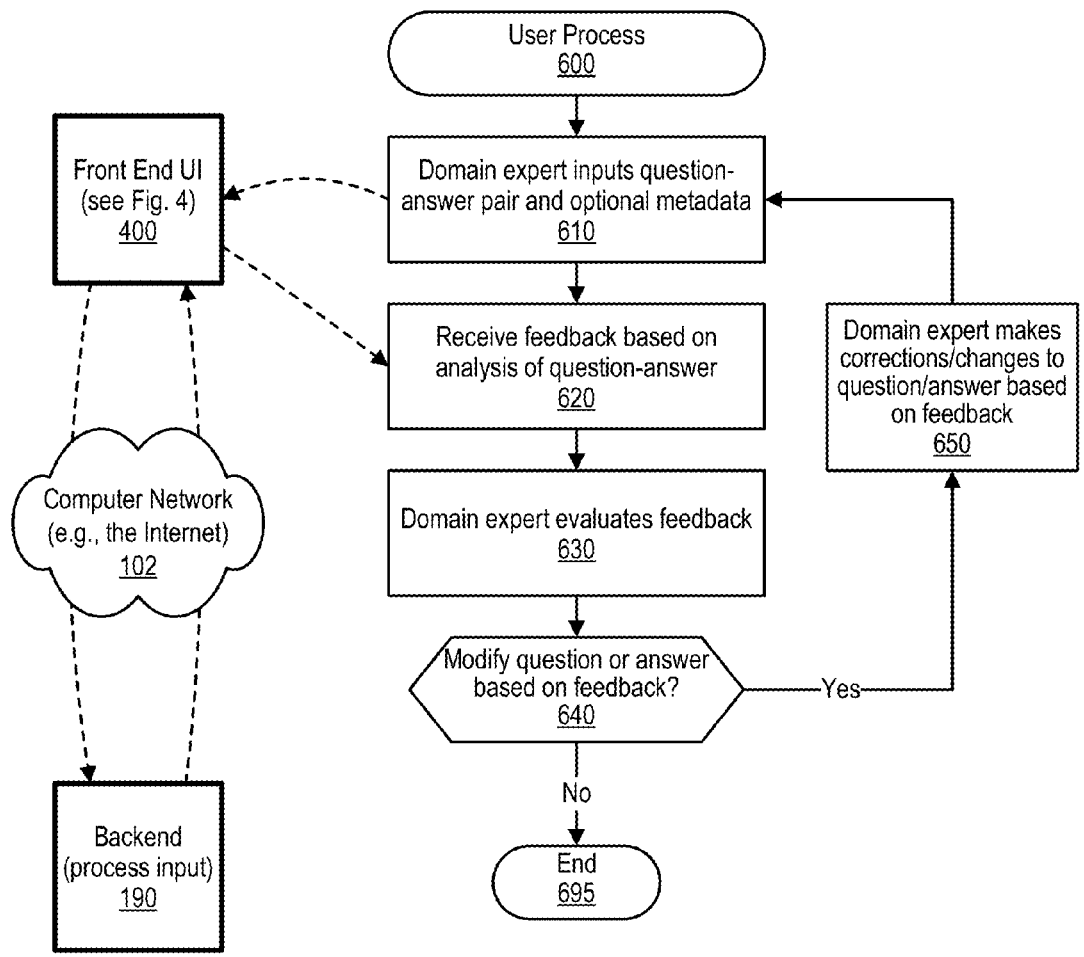
FIG. 6 is a depiction of a flowchart showing the logic performed by the domain user utilizing the user interface to input question-answer pairs and receiving feedback from the system.

FIG. 6 is a depiction of a flowchart showing the logic performed by the domain user utilizing the user interface to input question-answer pairs and receiving feedback from the system. The end user process commences at 600 whereupon, at step 610, the process receives a question-answer pair and any associated metadata from the domain expert user. The question-answer pair data is input by the domain expert user into front end user interface (400, see FIG. 4 and corresponding text for details of the user interface). The data input by the domain expert user is transmitted from the front end user interface to the backend process of the recommendation system (190). The recommendation system analyzes the question-answer pair data provided by the domain expert user and returns various data (problems detected, recommendations, information, etc.) resulting from the analysis.

At step 620 of the user process, the user process receives feedback from the recommendation system with the feedback including problems detected in the question-answer pair, recommendations to correct the detected problems, and information detected regarding the question-answer pair data. At step 630, the domain expert user evaluates the feedback received from the recommendation system. Based on the domain expert user's evaluation of the feedback, the user determines whether to modify the question-answer pair data (decision 640). If the domain expert user decides to modify the question-answer pair data, then decision 640 branches to the "yes" branch whereupon, at step 650, the process loops back for the domain expert user to modify the question-answer pair data and this modified question-answer pair data is processed by the recommendation system and further, refined, feedback data (problems detected, recommendations, information, etc.) is once again provided to the domain expert user as described above. This looping continues until the domain expert user no longer wishes to modify the question-answer pair data based on the feedback received from the recommendation system, at which point decision 640 branches to the "no" branch and processing ends at 695.

Based on the task being performed by the domain expert user, the resulting question-answer pair data can be used to train the question answering (QA) system. In addition, a batch process can be used instead of the user interface. With a batch process, the domain expert user would compile a set of many question-answer pair data and submit the set to the recommendation system with the recommendation system providing feedback (analysis, feedback, etc.) regarding each of the question-answer pairs submitted in the batch process.

Figure 7:
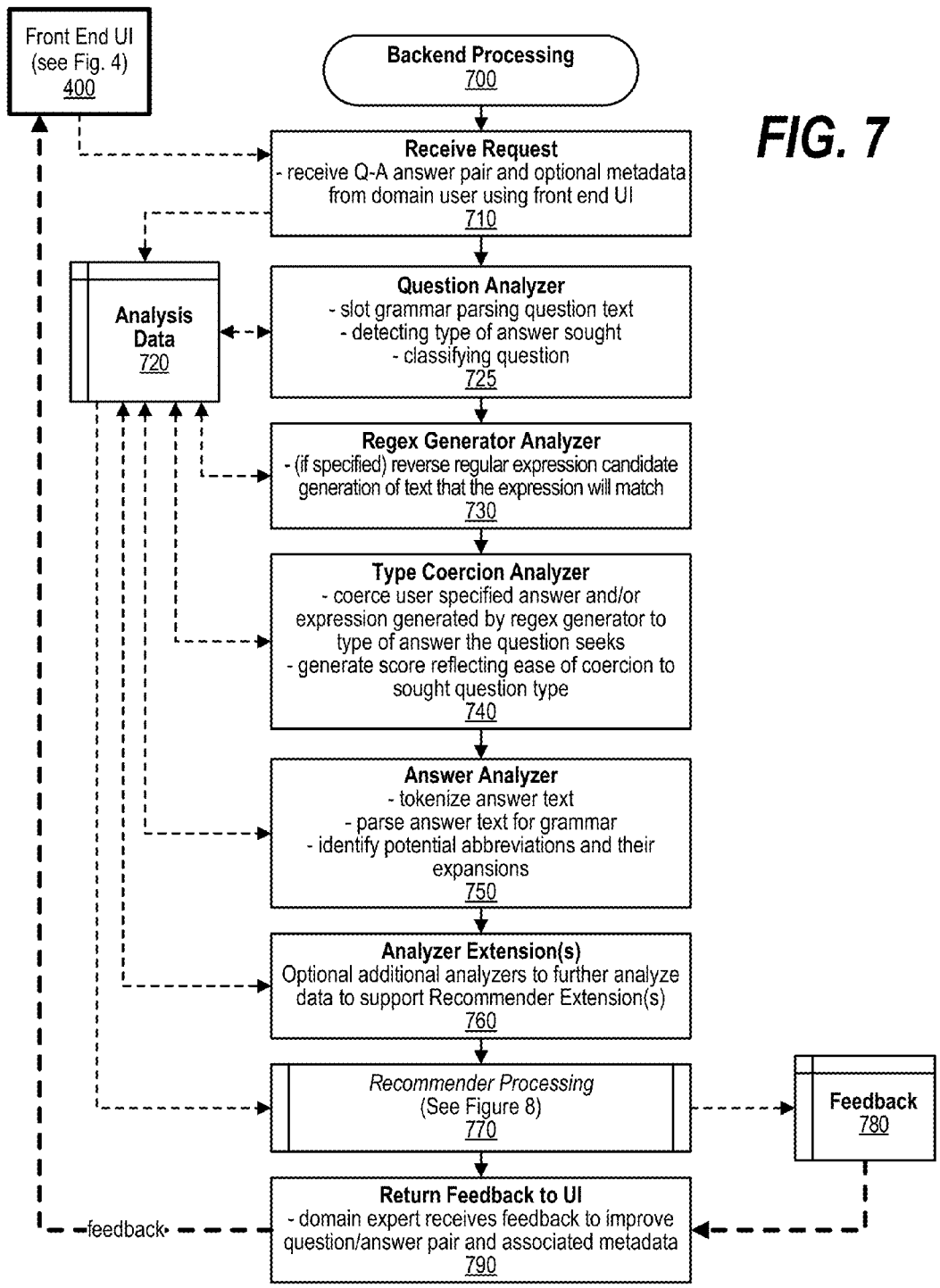
FIG. 7 is a depiction of a flowchart showing the logic performed by the backend process to analyze the question-answer pair.

FIG. 7 is a depiction of a flowchart showing the logic performed by the backend process to analyze the question-answer pair. Backend processing commences at 700 whereupon, at step 710, the process receives a request, such as from a front end user interface (400) or from a batch process. The process receives the question-answer pair data that includes the question and answer as well as any optional metadata provided by the domain expert user. The question-answer pair data is stored in memory area 720 for utilization by the various analysis steps performed by the recommendation system.

At step 725, the backend process of the recommendation system performs a question analyzer on the question-answer pair data. The question analyzer performs slot grammar parsing on the question text. The question analyzer further detects the type of answer sought by the question text. In addition, the question analyzer classifies the question. The results from the question analyzer are stored in memory area 720.

At step 730, the backend process of the recommendation system performs a regular expression (regex) generator analyzer processes any regex data included in the question-answer pair if such regex data was provided by the domain expert user. If regex data was provided by the domain expert user, the regex generator analyzer performs a reverse regular expression candidate generation of text that the regex expression will match. The resulting text that the regular expression will match is stored in memory area 720.

At step 740, the backend process of the recommendation system performs a type coercion analyzer on the question-answer pair data. The type coercion analyzer coerces the answer specified by the domain expert user and/or the expression generated by the regex generator to the type of answer that the question seeks (the type of answer that the question seeks being part of the results of step 725). The type coercion analyzer generates a score that reflects the ease of coercion of the answer to the type of answer that the question seeks. The coercion analyzer score and other type coercion analyzer results are stored in memory area 720.

At step 750, the backend process of the recommendation system performs an answer analyzer on the question-answer pair data. The answer analyzer tokenizes the answer text, parses the answer text for grammar, as well as identifies potential abbreviations and their expansions. The data resulting from the answer analyzer is stored in memory area 720.

Based on the application or domain of the recommendation system, additional extensions might be employed to provide further analysis for particular domains. For example, when used in a medical environment, additional analyzers can be used that are tailored to the medical environment. Furthermore, additional general analyzers can be developed and added as extensions. At step 760, if any additional analyzer extensions have been configured, the question-answer pair data as well as data resulting from other analyzers is processed by the additional analyzer extensions. The data resulting from the additional analyzer extensions is stored in memory area 720.

Figure 8:
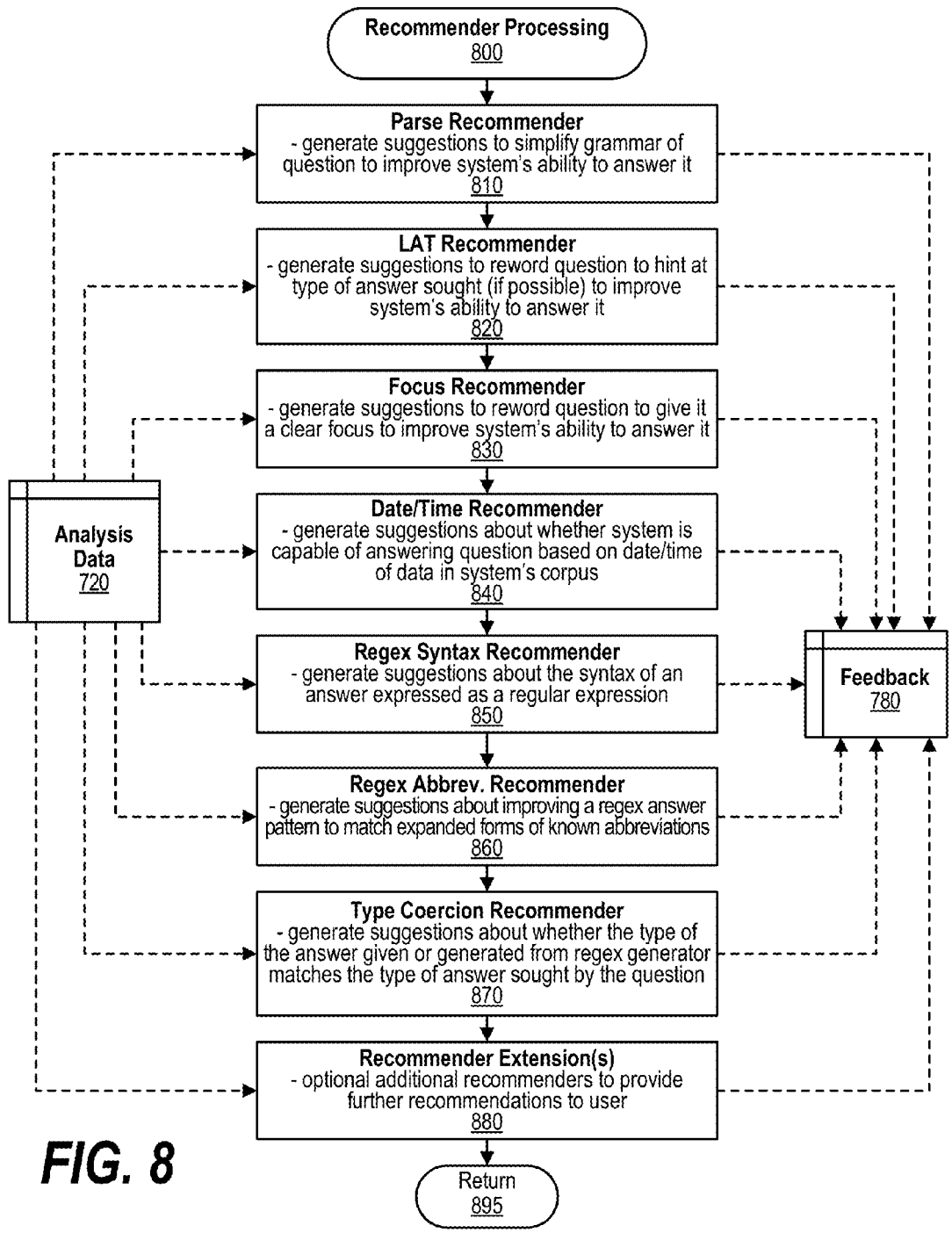
FIG. 8 is a depiction of a flowchart showing the logic performed by the backend process when performing recommendation processing.

At predefined process 770, the backend process of the recommendation system performs recommendation processing using the question-answer pair data and the data resulting from the various analyzers that is stored in memory area 720 (see FIG. 8 and corresponding text for processing details). Feedback resulting from the recommendation process is stored in memory area 780. At step 790, the feedback generated by the recommendation system is returned to the domain expert user. This feedback is received by the domain expert user and allows the domain expert user to improve the question-answer pair data that is being developed for use by the question answering (QA) system.

FIG. 8 is a depiction of a flowchart showing the logic performed by the backend process when performing recommendation processing. Recommendation processing commences at 800 whereupon, at step 810, the backend process of the recommendation system performs a parse recommender using data stored in memory area 720 that resulted from the analysis steps shown in FIG. 7. The parse recommender generates suggestions to simplify the grammar included in the question-answer pair data to improve the question answering (QA) system's ability to answer the question. The recommendations generated by the parse recommender are stored in feedback memory area 780.

At step 820, the process performs a lexical answer type (LAT) recommender routine. The LAT recommender generates suggestions to reword the question in order to hint at the type of answer that is being sought, if possible, to improve the QA system's ability to answer the question. The recommendations generated by the LAT recommender are stored in feedback memory area 780.

At step 830, the process performs a focus recommender routine using data stored in analysis memory area 720. The focus recommender generates suggestions to reword the question so that the question has a more clear focus. A question with a clearer focus will improve the QA system's ability to answer the question. The recommendations generated by the focus recommender are stored in feedback memory area 780.

At step 840, the process performs a date/time recommender routine using data stored in analysis memory area 720. The date/time recommender generates suggestions about whether the QA system is capable of answer the question included in the question-answer pair data based on the date/time of the data in the QA system's corpus. These suggestions help the domain expert user develop questions that the QA system is capable of answering. The recommendations generated by the date/time recommender are stored in feedback memory area 780.

At step 850, the process performs a regular expression (regex) syntax recommender routine using data stored in analysis memory area 720. The regex syntax recommender generates suggestions about the syntax of an answer that is expressed as a regular expression. The recommendations generated by the regex syntax recommender are stored in feedback memory area 780.

At step 860, the process performs a regular expression (regex) abbreviation recommender routine using data stored in analysis memory area 720. The regex abbreviation recommender generates suggestions regarding improving a regex answer pattern to match expanded forms of known abbreviations. The recommendations generated by the regex abbreviation recommender are stored in feedback memory area 780.

At step 870, the process performs a type coercion recommender routine using data stored in analysis memory area 720. The type coercion recommender generates about whether the type of the answer given in the question-answer pair data (or generated from the regex generator from regex data) matches the type of answer that is sought by the question. For example, a question in the question-answer pair may be asking for "how" something is done, but the answers from the question-answer pair may be answering "why" something is done. The recommendations generated by the type coercion recommender are stored in feedback memory area 780.

At step 880, the process performs routines for any recommender extensions using data stored in analysis memory area 720. The recommender extensions provide recommendations corresponding to any analyzer extensions that have been configured for the recommendation system (see step 760 in FIG. 7). The recommendations generated by the recommender extensions are stored in feedback memory area 780. After all of the recommender steps have been performed, processing returns to the calling routine (see FIG. 7) at 895.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, in an information handling system comprising a processor and a memory, of improving a quality of question-answer sets used as inputs to a question-answering (QA) system, the method comprising:
   receiving, from a user interface that is utilized by a user, a question-answer pair;
   analyzing the question-answer pair using natural language processing (NLP) components, wherein the question-answer pair includes a question and an answer to the question, and wherein at least one of the NLP components is a configurable analyzer extension;
   identifying, based on the analysis, one or more shortcomings of the question-answer pair, wherein the shortcomings relate to an ability of the target QA system to analyze the question;
   providing a human-readable feedback to the user by transmitting the human-readable feedback to the user interface, wherein the feedback recommends one or more possible actions to address the identified shortcomings; and
   receiving, from the user interface, a modified question-answer pair input by the user, wherein the modified question-answer pair addresses at least one of the shortcoming by performing at least one of the possible actions included in the human-readable feedback.

2. The method of claim 1 wherein the analyzing further comprises:
   processing the question-answer pair by one or more components of the target QA system.

3. The method of claim 2 wherein at least one of the components is user selectable to perform domain-specific question-answer set analysis and give recommendations customized for the user that is an expert in the domain.

4. The method of claim 1 wherein at least one of the shortcomings is selected from the group consisting of a misspelled word in the question, a misspelled word in the answer, the question being an incomplete sentence, the question being poorly worded, the question includes at least one term that is unknown to the QA system, the answer includes at least one term that is unknown to the QA system, the question fails to suggest a lexical answer type (LAT), a first LAT corresponding to the question fails to match a second LAT corresponding to the answer, a regular expression corresponding to the answer includes errors, the regular expression corresponding to the answer fails to match any text in a provided source document, the regular expression corresponding to the answer potentially matches one or more incorrect answers, the regular expression corresponding to the answer fails to consider alternative forms of one or more correct answers, the question is unanswerable based on a functionality of the QA system.

5. The method of claim 1 wherein at least one of the possible actions included in the feedback is selected from the group consisting of a spelling correction, a grammar correction, a rewrite of the question into a proper sentence, a replacement of one or more specialized terms with one or more common terms, a rewording of the question to suggest a lexical answer type (LAT), a rewording of a first LAT corresponding to the question in order to match a second LAT corresponding to the answer, a suggestion to reword the question to provide a more clear focus of the question, a suggestion to modify a syntax of the answer that is expressed as a regular expression, a suggestion to reword the answer that is expressed as the regular expression to match expanded forms of known abbreviations, and a suggestion to modify a first type corresponding to the answer to match a second type corresponding to the question.

6. The method of claim 1 further comprising:
receiving, prior to the transmission of the human-readable feedback, a regular expression provided by the user that matches one or more other correct answers; and
receiving, prior to the transmission of the human-readable feedback, a network address provided by the user, wherein the network address corresponds to a network location that includes the answer.

7. An information handling system comprising:
one or more processors;
a memory coupled to at least one of the processors; and
a set of instructions stored in the memory and executed by at least one of the processors to improve a quality of question-answer sets used as inputs to a question-answering (QA) system, wherein the set of instructions perform actions of:
  receiving, from a user interface that is utilized by a user, a question-answer pair;
  analyzing the question-answer pair using natural language processing (NLP) components, wherein the question-answer pair includes a question and an answer to the question, and wherein at least one of the NLP components is a configurable analyzer extension;
  identifying, based on the analysis, one or more shortcomings of the question-answer pair, wherein the shortcomings relate to an ability of the target QA system to analyze the question; and
  providing a human-readable feedback to the user by transmitting the human-readable feedback to the user interface, wherein the feedback recommends one or more possible actions to address the identified shortcomings; and
  receiving, from the user interface, a modified question-answer pair input by the user, wherein the modified question-answer pair addresses at least one of the shortcoming by performing at least one of the possible actions included in the human-readable feedback.

8. The information handling system of claim 7 wherein the analyzing further comprises:
processing the question-answer pair by one or more components of the target QA system.

9. The information handling system of claim 8 wherein at least one of the components is user selectable to perform domain-specific question-answer set analysis and give recommendations customized for the user that is an expert in the domain.

10. The information handling system of claim 7 wherein at least one of the shortcomings is selected from the group consisting of a misspelled word in the question, a misspelled word in the answer, the question being an incomplete sentence, the question being poorly worded, the question includes at least one term that is unknown to the QA system, the answer includes at least one term that is unknown to the QA system, the question fails to suggest a lexical answer type (LAT), a first LAT corresponding to the question fails to match a second LAT corresponding to the answer, a regular expression corresponding to the answer includes errors, the regular expression corresponding to the answer fails to match any text in a provided source document, the regular expression corresponding to the answer potentially matches one or more incorrect answers, the regular expression corresponding to the answer fails to consider alternative forms of one or more correct answers, the question is unanswerable based on a functionality of the QA system.

11. The information handling system of claim 7 wherein at least one of the possible actions included in the feedback is selected from the group consisting of a spelling correction, a grammar correction, a rewrite of the question into a proper sentence, a replacement of one or more specialized terms with one or more common terms, a rewording of the question to suggest a lexical answer type (LAT), a rewording of a first LAT corresponding to the question in order to match a second LAT corresponding to the answer, a suggestion to reword the question to provide a more clear focus of the question, a suggestion to modify a syntax of the answer that is expressed as a regular expression, a suggestion to reword the answer that is expressed as the regular expression to match expanded forms of known abbreviations, and a suggestion to modify a first type corresponding to the answer to match a second type corresponding to the question.

12. The information handling system of claim 7 wherein the actions further comprise:
receiving, prior to the transmission of the human-readable feedback, a regular expression provided by the user that matches one or more other correct answers; and
receiving, prior to the transmission of the human-readable feedback, a network address provided by the user, wherein the network address corresponds to a network location that includes the answer.

13. A computer program product stored in a non-transitory computer readable medium, comprising computer instructions that, when executed by an information handling system, causes the information handling system to improve a quality of question-answer sets used as inputs to a question-answering (QA) system by performing actions comprising:
  receiving, from a user interface that is utilized by a user, a question-answer pair;
  analyzing the question-answer pair using natural language processing (NLP) components, wherein the question-answer pair includes a question and an answer to the question, and wherein at least one of the NLP components is a configurable analyzer extension;
  identifying, based on the analysis, one or more shortcomings of the question-answer pair, wherein the shortcomings relate to an ability of the target QA system to analyze the question; and
  providing a human-readable feedback to the user by transmitting the human-readable feedback to the user interface, wherein the feedback recommends one or more possible actions to address the identified shortcomings; and
  receiving, from the user interface, a modified question-answer pair input by the user, wherein the modified question-answer pair addresses at least one of the shortcoming by performing at least one of the possible actions included in the human-readable feedback.

14. The information handling system of claim 13 wherein the analyzing further comprises:
processing the question-answer pair by one or more components of the target QA system.

15. The information handling system of claim 14 wherein at least one of the components is user selectable to perform domain-specific question-answer set analysis and give recommendations customized for the user that is an expert in the domain.

16. The information handling system of claim 13 wherein at least one of the shortcomings is selected from the group consisting of a misspelled word in the question, a misspelled word in the answer, the question being an incomplete sentence, the question being poorly worded, the question includes at least one term that is unknown to the QA system, the answer includes at least one term that is unknown to the QA system, the question fails to suggest a lexical answer type (LAT), a first LAT corresponding to the question fails to match a second LAT corresponding to the answer, a regular expression corresponding to the answer includes errors, the regular expression corresponding to the answer fails to match any text in a provided source document, the regular expression corresponding to the answer potentially matches one or more incorrect answers, the regular expression corresponding to the answer fails to consider alternative forms of one or more correct answers, the question is unanswerable based on a functionality of the QA system.

17. The information handling system of claim 13 wherein at least one of the possible actions included in the feedback is selected from the group consisting of a spelling correction, a grammar correction, a rewrite of the question into a proper sentence, a replacement of one or more specialized terms with one or more common terms, a rewording of the question to suggest a lexical answer type (LAT), a rewording of a first LAT corresponding to the question in order to match a second LAT corresponding to the answer, a suggestion to reword the question to provide a more clear focus of the question, a suggestion to modify a syntax of the answer that is expressed as a regular expression, a suggestion to reword the answer that is expressed as the regular expression to match expanded forms of known abbreviations, and a suggestion to modify a first type corresponding to the answer to match a second type corresponding to the question.

* * * * *